Patented Sept. 12, 1933

1,926,578

UNITED STATES PATENT OFFICE 1,926,578

ARTIFICIAL FUEL AND METHOD OF PRODUCING SAME

Edgar Thomas Brown, Huntington Park, Calif., assignor of one-third to William Crowell, Huntington Park, Calif., and one-third to Fred Cunningham, South Gate, Calif.

No Drawing. Application February 23, 1932
Serial No. 594,743

4 Claims. (Cl. 44—1)

My invention relates to artificial fuel and the method of producing same and has for its principal object, the provision of a relatively simple and easily practiced method for producing a comparatively inexpensive and highly efficient artificial fuel from waste paper, a petroleum product such as crude oil or fuel oil and relatively small quantities of other ingredients which give added value and effectiveness to the manufactured product.

Further objects of my invention are, to produce an artificial fuel that ignites readily, is highly effective in the production of heat, produces a relatively small amount of ash and which may be conveniently used wherever the economical development of heat is desirable.

A further object of my invention is, to produce an artificial fuel that may be readily formed into briquettes or small blocks and which will not readily deteriorate in storage and which is at all times, dustless.

Briefly my invention consists in briquettes or blocks formed of shredded waste paper, a petroleum product such as crude oil or fuel oil and relatively small quantities of spirits of turpentine, spirits of camphor and crude rubber.

In the production of fuel by my improved method, waste paper and the like is caused to pass through a suitable machine or apparatus that tears or cuts the paper and like material into shreds and this shredded paper is sprayed with a petroleum product, for instance, crude oil or fuel oil, to which has been added relatively small quantities of spirits of turpentine, spirits of camphor and crude rubber.

In order to achieve best results, the liquid compound may be composed of ninety-four (94%) percent petroleum product and two (2%) percent each of spirits of turpentine, spirits of camphor and crude rubber or practically the same desirable results may be attained through the use of a liquid compound composed of ninety-seven (97%) percent petroleum product and one (1%) percent each of spirits of turpentine, spirits of camphor and crude rubber.

After the shredded paper has been thoroughly sprayed with the oleaginous compound it is, by suitable means, pressed into blocks or briquettes of suitable form and size and the degree of pressure utilized in forming the blocks and briquettes is such as to expel the greater part of the oleaginous compound from the shredded paper, leaving only a relatively small quantity of the compound on the surfaces of the paper shreds.

The pressure to which the briquettes or blocks are subjected is such that said blocks or briquettes are practically dry when they are discharged from the briquette machine and they may be readily handled and placed in suitable sacks or containers and stored until used.

The oleaginous compound that is expelled from the briquettes when the same are subjected to pressure is returned to the spraying apparatus, to be used for spraying subsequent batches of shredded paper.

The shredded paper treated with the petroleum product, provides a highly combustible product and I have demonstrated in practice that the addition of the relatively small quantities of spirits of turpentine and spirits of camphor increase the combustibility of the briquettes and the small quantity of rubber used in the compound functions as a binder for the paper shreds and small pieces.

The briquettes ignite readily and in a very short time after ignition said briquettes produce relatively high degrees of heat.

After the briquettes have been ignited and are burning, the heat generated produces within the bodies of the briquettes a gas which ignites and burns.

The briquettes when consumed, leave very little ash and there is no deterioration of the briquettes even when stored for a considerable period of time.

The briquettes are dustless and may be conveniently and economically used in stoves, grates, furnaces, in the fire boxes of steam boilers and locomotives and as said briquettes in burning, produce very little if any smoke, they provide an ideal fuel for use in orchard heaters.

I claim as my invention:

1. The herein described method of producing artificial fuel, which consists in shredding waste paper and then spraying the shredded paper with a liquid compound, composed of a petroleum product and relatively small quantities of spirits of turpentine and spirits of camphor.

2. The herein described method of producing artificial fuel, which consists in shredding waste paper and then spraying the shredded paper with a liquid compound composed of a petroleum product and relatively small quantities of spirits of turpentine, spirits of camphor and crude rubber.

3. The herein described artificial fuel composed of shredded waste paper sprayed with a petroleum product with which is combined relatively small quantities of spirits of turpentine and spirits of camphor.

4. The herein described artificial fuel composed of shredded waste paper sprayed with a petroleum product with which is combined relatively small quantities of spirits of turpentine, spirits of camphor and crude rubber.

EDGAR THOMAS BROWN.